United States Patent [19]

Zinsmeyer et al.

[11] Patent Number: 5,404,964
[45] Date of Patent: Apr. 11, 1995

[54] SYSTEM FOR REDUCING OIL MIGRATION FROM A TRANSMISSION

[75] Inventors: Thomas M. Zinsmeyer, Pennellville; Vishnu M. Sishtla, Cicero, both of N.Y.

[73] Assignee: Carrier Corporation, Syracuse, N.Y.

[21] Appl. No.: 967,329

[22] Filed: Oct. 28, 1992

Related U.S. Application Data

[63] Continuation-in-part of Ser. No. 740,222, Aug. 5, 1991, abandoned.

[51] Int. Cl.⁶ .................................... F01M 11/00
[52] U.S. Cl. ........................ 184/6.12; 184/6.16; 184/6.23; 184/6.27; 184/13.1; 415/122.1
[58] Field of Search .................. 415/122.1, 208.1; 417/423.6, 423.12, 423.13; 184/6.12, 6.16, 6.23, 6.27, 11.1, 13.1; 418/55.6

[56] References Cited

U.S. PATENT DOCUMENTS

| | | | |
|---|---|---|---|
| 1,191,217 | 7/1916 | Oderman | 184/6.27 |
| 2,485,417 | 10/1949 | Steenstrup | |
| 2,504,748 | 4/1950 | Steenstrup | 184/6.16 |
| 3,006,439 | 10/1961 | Molinaro | 184/6.12 |
| 3,734,637 | 5/1973 | Beck, Jr. | 417/423.6 |
| 3,853,433 | 12/1974 | Roberts et al. | 417/423.13 |
| 4,389,160 | 6/1983 | Onal | 415/122.1 |
| 4,488,730 | 12/1984 | Grachtrup | 184/6.12 |
| 4,683,771 | 8/1987 | Sogo et al. | 184/11.1 |
| 4,938,664 | 7/1990 | Zinsmeyer | 184/6.16 |

FOREIGN PATENT DOCUMENTS 0292540  9/1928  United Kingdom ............... 184/13.1

Primary Examiner—Edward K. Look
Assistant Examiner—Christopher Verdier

[57] ABSTRACT

A gear shroud is provided in close surrounding relationship to the drive gear of a centrifugal compressor such that the turbulence within the surrounding gear housing is substantially reduced and the resulting high speed flow of refrigerant is instead directed into an adjacent oil sump. In order to prevent localized churning in the sump and the resulting cavitation at the oil pump as might be caused by the high velocity flow of refrigeration gas from the gear shroud, a baffle is provided over the oil pump to divert the inflow of gas into other areas of the sump.

2 Claims, 4 Drawing Sheets

SYSTEM FOR REDUCING OIL MIGRATION FROM A TRANSMISSION

CROSS-REFERENCE TO RELATED APPLICATIONS

This application is a continuation-in-part of application Ser. No. 740,222 filed Aug. 5, 1991.

BACKGROUND OF THE INVENTION

This invention relates generally to centrifugal compressors and, more particularly, to an improved lubrication method and apparatus therefor.

Hermetic centrifugal refrigeration compressors generally use an electric motor to drive the impeller through a geared up transmission. In such a compressor, the transmission is typically vented to a source of low pressure within the chiller to minimize the outward migration of oil through the shaft seals. It has been recognized that during this venting process, in addition to the refrigerant gas passing out of the transmission, some of the oil in the form of droplets or mist tends to become entrained within the refrigerant gas so as to also pass out of the transmission. This has not been a particular problem with conventional refrigerants of moderate pressure and densities.

With the more recent use of higher pressure and higher density refrigerants, such as R-22, the above described problem of oil carry-over has become more significant. That is, because of the higher pressure refrigerant, it is necessary to operate with larger gears operating at higher speeds. This, in turn, increases the turbulence which tends to cause large volumes of lubricant to be drawn up from the integral sump and enter into the compression cycle by way of the low pressure vent opening. Further, the larger pressure differentials tend to promote higher vent gas flow rates and therefore increased carry-over.

In addition to the refrigerant higher pressures, the higher densities also tend to exasperate the problem. That is, the increased densities tend to keep the oil droplets in suspension longer and makes separation more difficult. In addition, the higher densities also increase mechanical losses from centrifugal type oil separation mechanisms.

Considering now the result of oil carry-over that occurs when the oil that is drawn up from the sump by turbulence is vented to the compressor inlet, it passes through the compressor and is discharged into the condenser, where it tends to coat the heat exchanger surface to thereby decrease the efficiency thereof. Some of the oil is then passed on to the cooler where the same phenomenon occurs. Thus, it will be recognized that high oil carry-over rates tend to result in reduced heat exchanger performance. Moreover, as the oil supply in the sump is diminished because of this phenomenon, there may no longer be a sufficient amount of oil to ensure that all of the moving parts that require lubrication are in fact receiving adequate supplies of oil.

The oil carryover problem has been addressed in two different ways. First, the most common approach is to use a mesh type oil separator in the vent line to cause oil droplets to coalesce and drain back into the transmission. A second method uses a series of hollow rotating spokes to centrifuge out the unwanted oil mist component of the vent flow. Neither of these methods, by themselves or in combination, are found to be sufficient for containing oil in a centrifugal compressor using high pressure, high density refrigerant such as R-22.

It is therefore an object of the present invention to provide an improved oil containment system for a centrifugal compressor.

Another object of the present invention is the provision for limiting oil carry-over in a centrifugal compressor.

Yet another object of the present invention is the provision in a centrifugal compressor using high pressure, high density refrigerant, for limiting the high oil carry-over rates that would otherwise occur.

Still another object of the present invention is the provision for a transmission oil containment system that is economical to manufacture and effective in use.

These objects and other features and advantages become more readily apparent upon reference to the following description when taken in conjunction with the appended drawings.

SUMMARY OF THE INVENTION

Briefly, in accordance with the one aspect of the invention, a shroud is placed around the drive gear in the transmission to thereby substantially reduce the turbulence that would otherwise occur within the transmission housing to cause the lubricant to be drawn up from the sump. Thus, the carry-over of lubricant is substantially reduced.

By yet another aspect of the invention, a baffle is placed within the sump, in the vicinity of the location where the gear shroud discharge occurs. The baffle functions to divert the high volume, high velocity flow being directed from the shroud and to prevent it from displacing the oil in the sump in the vicinity of the oil pump intake, which would otherwise tend to deprive the oil pump from a sufficient supply of oil.

In the drawings as hereinafter described, a preferred embodiment is depicted; however, various modifications and alternate constructions can be made thereto without departing from the true spirit and scope of the invention.

DESCRIPTION OF THE PREFERRED EMBODIMENT

Figure 1:
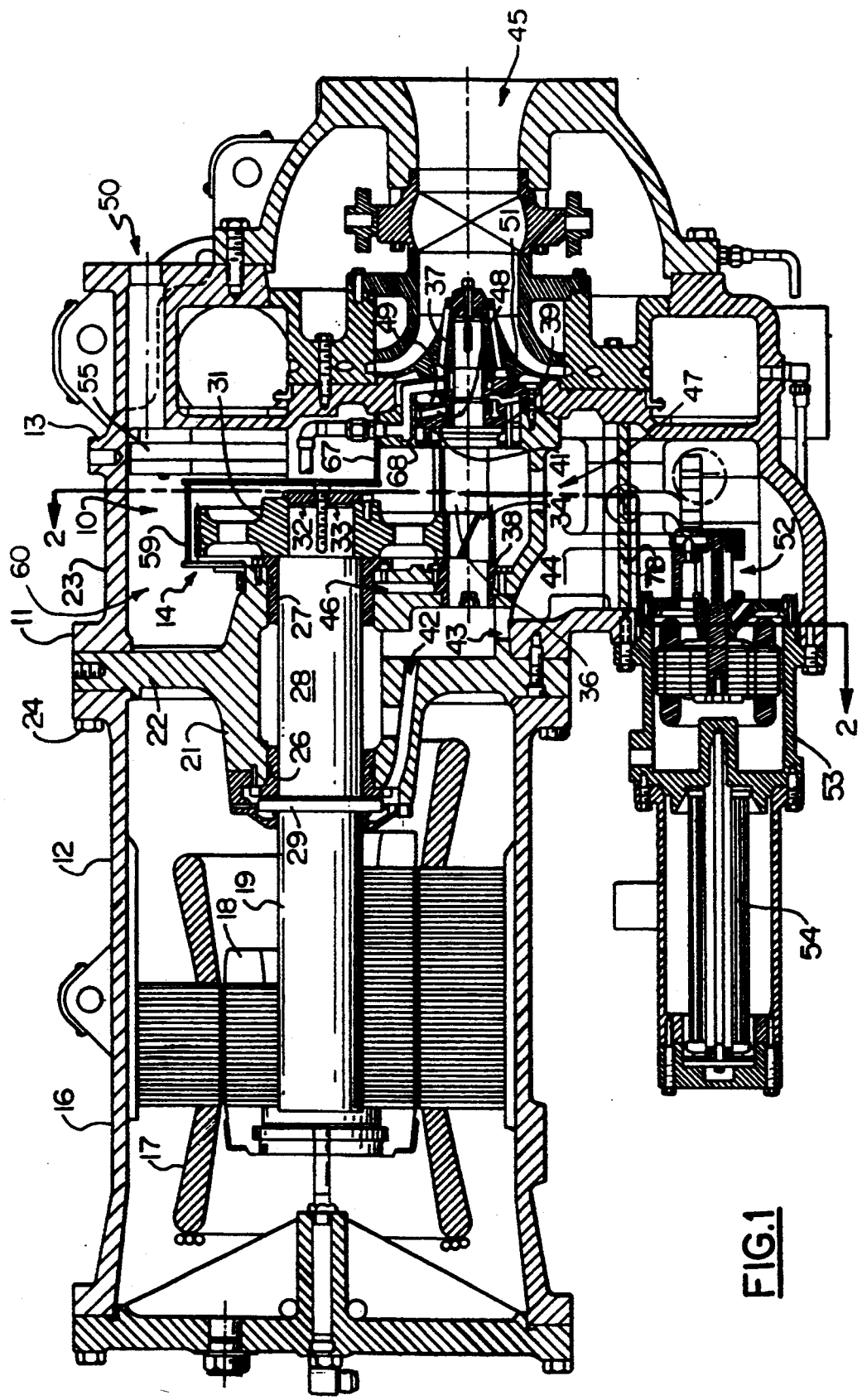
FIG. 1 is a longitudinal sectional view of a centrifugal compressor having the present invention embodied therein.
Figure 3:
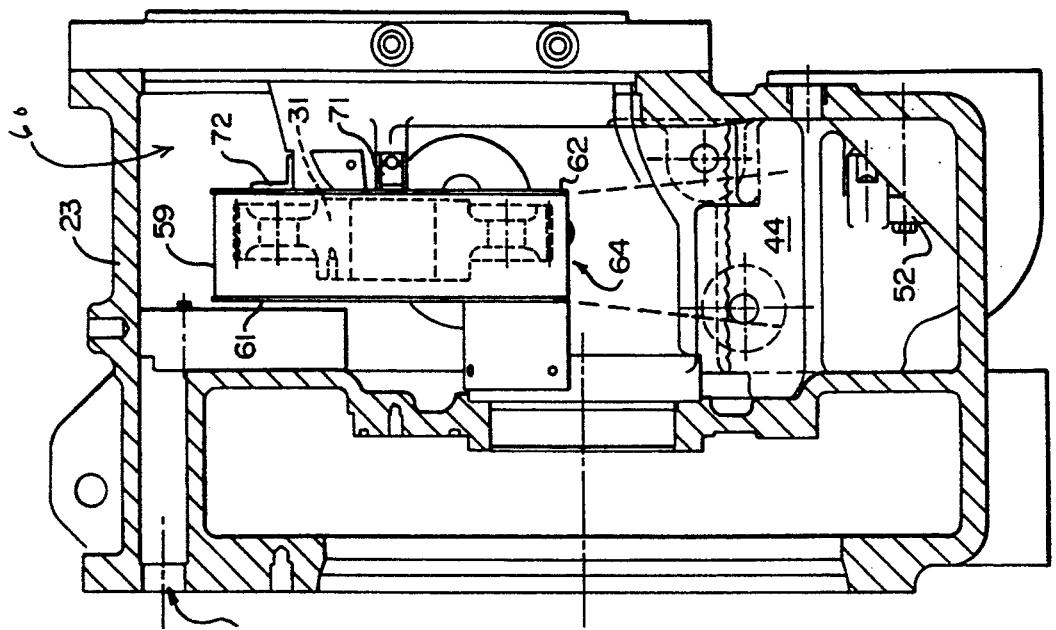
FIG. 3 is a partial longitudinal sectional view of the centrifugal compressor as seen from the rear.

Referring now to FIG. 1, the invention is shown generally at 10 as embodied in a centrifugal compressor system 11 having an electric motor 12 at its one end and a centrifugal compressor 13 at its other end, with the two being interconnected by a transmission 14. The motor 12 includes an outer casing 16 with a stator coil 17 disposed around its inner circumference. The rotor 18 is then rotatably disposed within the stator winding 17 by way of a rotor shaft 19 which is overhung from, and supported by, the transmission 14.

The transmission 14 includes a transmission assembly 21 having a radially extending annular flange 22 which is secured between the motor casing 16 and the compressor casing 23 by plurality of bolts 24. Rotatable mounted within the transmission assembly 21, by way of a pair of axially spaced bearings 26 and 27 is a transmission shaft 28 which is preferably integrally formed as an extension of the motor shaft 19. The collar 29, which is attached or installed by shrink fit, is provided to transmit the thrust forces from the shaft 28 to the thrust bearing portion of the bearing 26. The end of shaft 28 extends beyond the transmission assembly 21 where a drive gear 31 is attached by way of a retaining plate 32 and a bolt 33.

The drive gear 31 engages a driven gear 34 which in turn drives a high speed shaft 36 for directly driving the compressor impeller 37. Typical speeds for the respective shafts are 3550 rpm for the transmission shaft 28 and 16,000 rpm for the high speed driven shaft 36. The high speed shaft 36 is supported by bearings, one of which is shown at 38 and the other at 39. A thrust bearing 41 is provided to counteract the axial thrust that is developed by the impeller 37.

Lubrication of the bearings occurs as follows. Oil is provided to the bearing 26 and 27 by way of the transmission assembly 21. Oil from the bearing 26 flows through the passage 42 and then through the opening 43 to the sump 44. From the oil supply annulus surrounding bearing 27 the oil flows into passage 46 to lubricate the bearing 38. The oil then runs from the left side of the bearing 38 through the opening 43 to enter the sump 44. Similarly, it flows from the right side of the bearing 38 through the opening 47 into the sump 44.

Referring now to the bearing 39 at the other end of the high speed shaft 36, an oil feed passage 48 is provided as a conduit for oil flowing radially inwardly to the bearing surfaces, and an oil slinger 49 is provided to sling the oil radially outwardly from the shaft 36. Annular cavity 51 functions to receive the oil which is slung off from the bearing 39 and to facilitate the drainage of oil through a passage (not shown) to the sump 44.

As the oil accumulates in the sump 44, it is drawn into the inlet 52 of the oil pump 53, which functions to pump it through a filter 54 and then to the system components for lubrication thereof.

In order to limit the migration of oil from the transmission 14 by way of the shaft seals, the area 60 surrounding the transmission 14 is vented to a source of low pressure refrigerant (i.e. to the compressor inlet 45) by way of a transmission vent opening 50. An oil separator or demister 55 is provided to recover a certain amount of entrained oil before the refrigerant passes into the opening 50. Such an oil separator, however, will not, by itself, suffice if the amount of oil that is so entrained or otherwise drawn up by turbulence is excessive, such as tends to be the case with high speed, high pressure machines such as those used with R-22 refrigerant. It is the purpose of the present invention to limit this oil carry-over by the use of structural features in the system.

It is recognized that, unless a change is made to the conventional machine, a certain amount of oil is going to be thrown radially outwardly by the drive gear 31 to be entrained within the refrigerant surrounding the transmission 14. But, more significantly, a large amount of oil is going to be drawn up from the adjacent sump by the turbulence created from the windage resulting from high speed operation of the relatively large gears. To prevent this, a gear shroud 59 is provided in close (i.e. 0.25–0.375 in.) surrounding relationship to the gear 31. The gear shroud 59 is shown in FIGS. 1–5. As will be seen, the gear shroud 59 includes a front wall 61 and a rear wall 62, with the two being interconnected by way of a semi-cylindrical portion 63. The semi-cylindrical portion 63 circumscribes an angle of about 270° as it extends from its one end 64 to the other 65. Near the end 64, the semi-cylindrical portion becomes planar in form to provide, in combination with portions of the front 61 and rear 62 walls, a discharge chute 66 that functions to direct the large volume flow of refrigerant and oil mixture that is contained by the gear shroud 59 in a downward direction toward the oil pump 53.

Integrally connected to and extending substantially normally from the shroud front wall 61 is a semi-cylindrical extension portion 67 which is fastened to the casing 68 by a plurality of fasteners passing through hole 69. This member functions to isolate the area surrounding the high speed shaft 36 from the area 60 surrounding the transmission 14 such that windage is contained so as to not cause turbulence in that surrounding area.

On the rear wall 62 of the gear shroud 59 there are provided a plurality of fastening brackets 71, 72 and 73, which allow for a fastening of the gear shroud 59 to the transmission assembly 21 by appropriate fasteners. In this way, the gear shroud 59 is rigidly supported between the transmission assembly 21 and the casing 68 so as to form a barrier between the drive gear 31 and the area surrounding the transmission 14. The relatively large volume flow of refrigerant and oil trapped between the gear and the shroud tends to flow downwardly to be discharged from the discharge chute 66 where it enters the sump 44.

It should be mentioned that the oil that is on the drive gear 31 originates from both the bearing 27 and from a supply of oil that is directed specifically to the drive gear 31 and the high speed driven gear 34. This oil enters by way of a spray device 74 which is mounted on a casing 76 (see FIG. 2), to cause oil to flow directly onto the gears. A stripper 77 is provided to strip the excess oil from the drive gear 31 and allow it to fall down into the sump.

Figure 2:
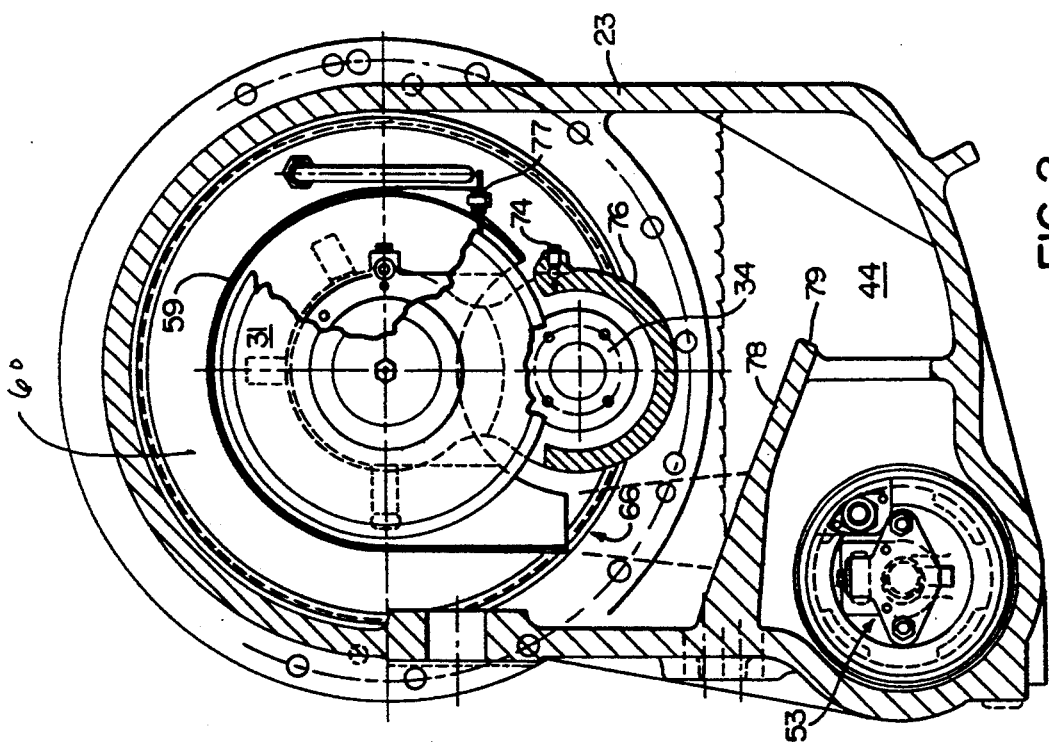
FIG. 2 is an axial sectional view thereof as seen along lines 2—2 of FIG. 1.
Figure 5:
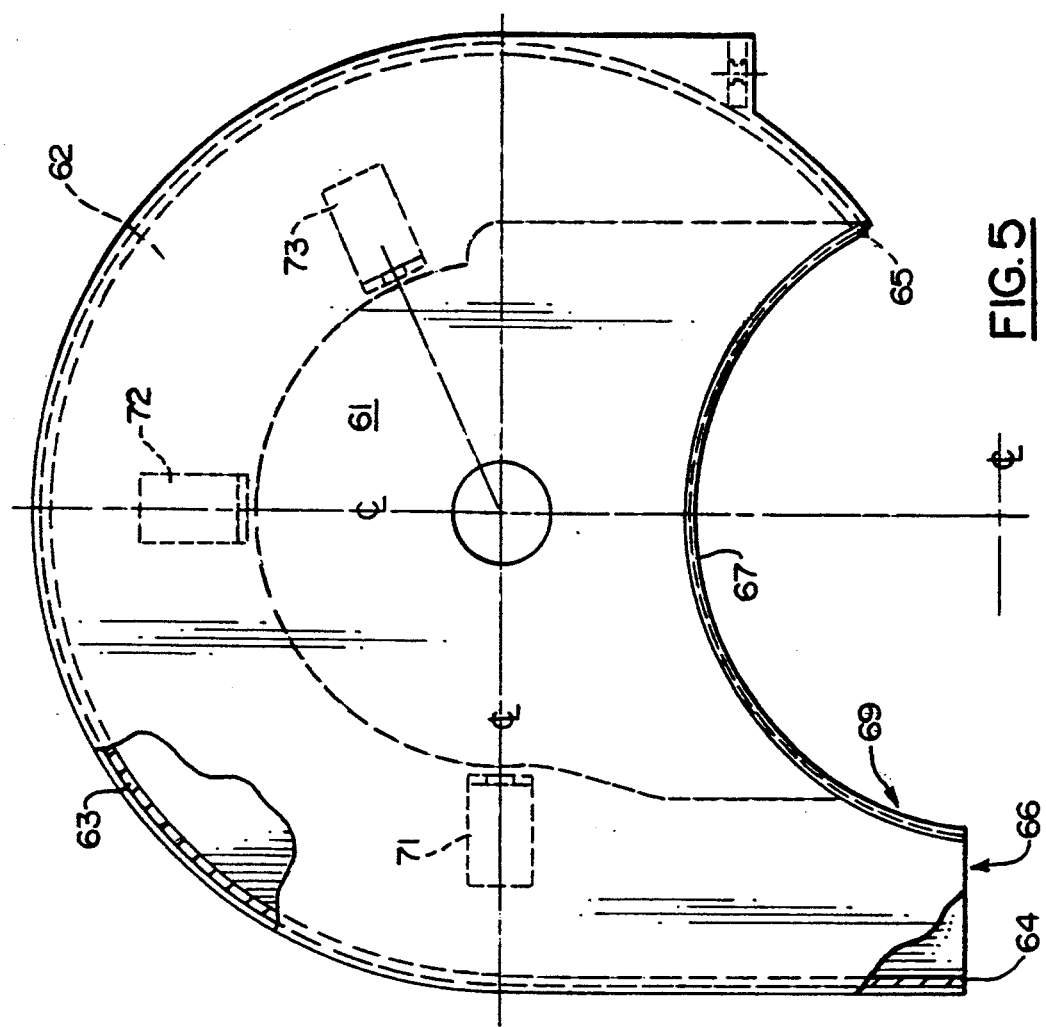
FIG. 5 is a front view thereof.
Figure 4:
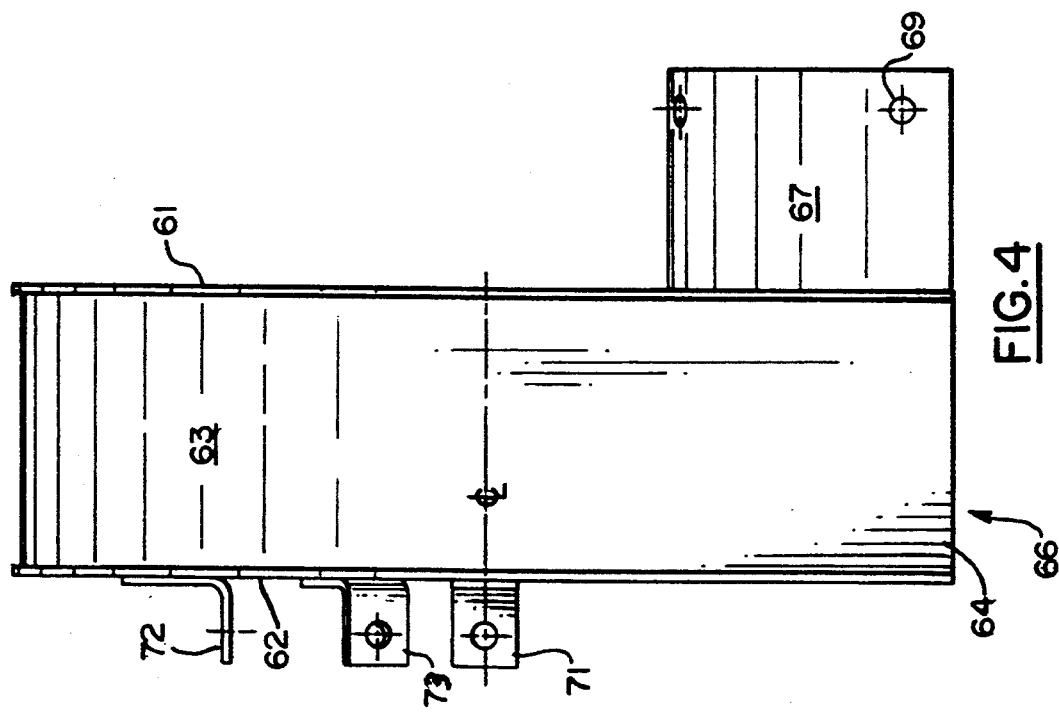
FIG. 4 is a side view of the gear shroud portion of the invention.

Considering now the affect of the gear shroud 59 as it contains the windage effect and directs the resultant flow into the sump 44, it will be seen in FIG. 2 that the discharge chute 66 is directly over the oil pump 53 in the sump. Because of the high speed at which the drive gear 31 rotates, the refrigerant and oil mixture is discharged with such a force that it tends to cause cavitation in the oil pump 53 by evacuating the oil from the sump in that locality. Further, the gear teeth act as a fan or blower to propel a large volume of refrigerant gas plus entrained oil. The oil and gas mixture produces a frothy solution in the sump which, when ingested by the pump, causes cavitation. To prevent this from occurring, a baffle 78 (see FIGS. 1 and 2) is provided as an integral part of the compressor casing 23 that extends outwardly and downwardly into the sump 44 to protect the oil pump from this phenomenon. That is, the submerged baffle 78 functions to protect the inlet 52 of the oil pump 53 from the localized churning and detrimental effects of refrigerant gas entrainment brought on by the close proximity of the gear shroud discharge chute 66 to the oil sump 44. The extended end 79 of the baffle 78 is secured to the compressor casing where it meets the side walls and is open under end 79 to allow for the free flow of oil from the sump to the oil pump 53.

Having described the system, the test procedure and apparatus for verification of the Applicants theories and solutions to the problem will now be described.

During the initial testing of the centrifugal compressor design as shown in FIG. 1, but without the benefit of the design features of the present invention, when operating with R22 refrigerant, a total loss of oil was observed to occur within two minutes of start up. It was eventually theorized that the gears rotating at relatively high speeds set the surrounding medium in motion and, since the oil sump was integral with the transmission housing, the oil in the sump was impacted by the resulting turbulence. As the pressure in the transmission is increased, the resulting force will also increase due to the increased density of the medium. Eventually this pressure reaches the level in which the force is large enough to carry the oil from the sump into the transmission housing and eventually to the evaporator by way of the vent line.

Figure 6:
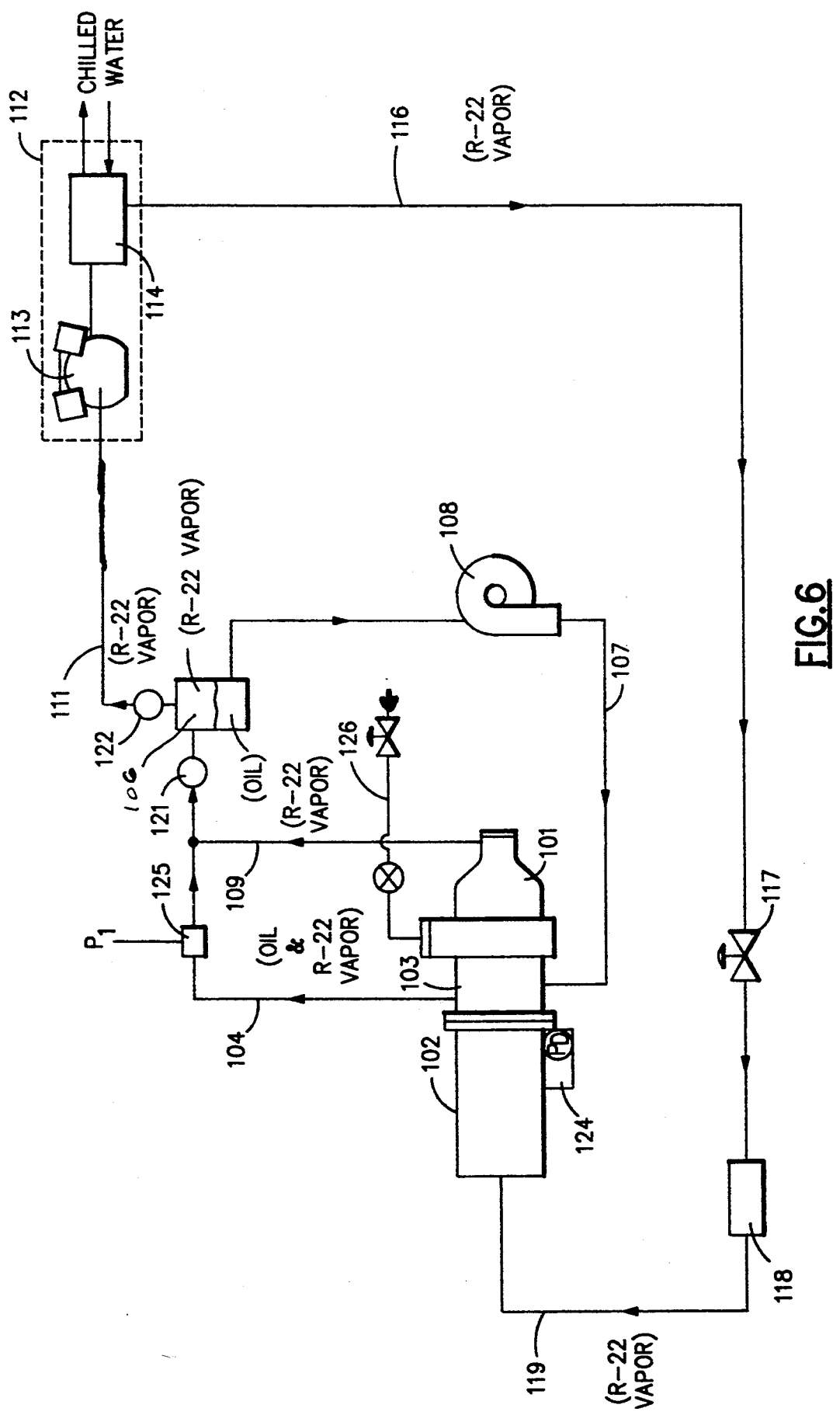
FIG. 6 is a schematic illustration of a test apparatus used to demonstrate the inventive concept.

In order to verify this theory, a test system was set up as shown in FIG. 6. A centrifugal compressor 101, without an impeller, was assembled to be driven by a motor 102 through a transmission 103. A vent line 104 lead from the housing of the transmission 103 to an oil separator 106, and a line 107 returned oil to the transmission 103 by way of an oil pump 108. Since there was no impeller provided, a line 109 was also provided to carry refrigerant vapor from the inlet of the compressor 101 to the oil separator 106.

Refrigerant vapor was taken from the oil separator 106 and was passed along line 111 to a pump down unit 112 including a compressor 113 and a condenser 114. From the condenser 114 the cooled refrigerant vapor passed along line 116 to a valve 117 and a refrigerant filter 118 to the motor 102 to provide cooling therefor. The flow rate of the condensing unit 114 was selected so as to match the flow of refrigerant through the transmission under normal operating conditions. In order to determine the amount of oil carry-over that occurred in the vent line 104, sight glasses 121 and 122 were provided. An oil cooler 124 was provided to cool the oil in the sump. A pressure sensor 125 was also provided to sense the pressure $P_1$ in the vent line 104 as indicated. Also, a line 126 was provided for charging refrigerant gas into the system.

An initial test run was conducted without the baffle arrangement of the present invention incorporated within the test system. The test system was charged with R22 at 10 psig, and the temperature of the oil in the sump was brought to 130° F. The pump-down unit 112, the oil pump located in the transmission 103, and the oil pump 108 in the return line from the separator 106 were started before starting the compressor 101. The pressure in the system was raised to 100 psig in steps of 10 psig by putting more refrigerant mass through line 126. Typically, the transmission of a system operates at about 65 psig. When observing the sight glass 121 as the pressure was increased, it was seen that, at 40 psig, there was a slight amount of oil flow in the vent line 104. At 60 psig the oil flow was on the order of 5 gallons per minute. Beyond 60 psig the flow of oil was found to increase proportionately.

After installing a shroud 59 around the gears in accordance with the present invention, the test was then repeated. As the pressure was increased from 10 psig to 100 psig, there was no oil loss through the vent line 104, as observed at the sight glass 121. However, it was observed that the oil pressure differential (i.e.—difference in oil pressure between pump discharge and at bearings) started to decrease when the pressure $P_1$ was 40 psig. When the pressure $P_1$ reached 60 psig, the oil pressure differential dropped below 10 psi, with the minimum acceptable level being 14 psi. From this, it was concluded that the high velocity discharge flow of gas and oil mixture from the shroud 59 was directed toward the oil pump, thereby forcing the oil away from the pump suction.

The test system was then modified to include the baffle 78 between the pump and the shroud discharge area in accordance with the present invention. The test was then repeated, and it was observed that there was no loss of oil in the vent line 104, and further there was no decrease in the oil pressure differential.

While the present invention has been disclosed with particular reference to the preferred embodiment, concepts of this invention are readily adapted to other embodiments, and those skilled in the art may vary the structure thereof without departing from the essential spirit of the present invention.

What is claimed is:

1. An improved centrifugal compressor of the type having a motor for driving an impeller through a low speed shaft, a lubricated low speed gear and a driven shaft, wherein the gear is located in a housing, above and fluidly communicating with an oil sump, and having a vent fluidly communicating with an area of lower pressure, wherein the improvement comprises:

a shroud disposed around a portion of the gear to reduce windage and resulting turbulence that would otherwise occur within the housing when the gear rotates at high speeds, to thereby prevent lubricant from being drawn up from the sump into the gear housing, said shroud instead acting to direct high velocity fluid flow from the gear into the sump; and an oil pump in the sump and a baffle disposed between the pump and the shroud to deflect the fluid flow from the shroud so as to prevent the displacement of lubricant from the vicinity of the oil pump.

2. A method of reducing oil loss from a transmission housing of a centrifugal compressor having a lubricated drive gear which tends to create windage and thus turbulence in the transmission housing to thereby cause lubricant in an integral oil sump to be drawn up into the housing, comprising the steps of:

placing a shroud in close proximity around a portion of the gear to substantially reduce the windage and resulting turbulence within the transmission housing to prevent lubricant from being drawn up from the sump into the gear housing;

providing a discharge section on said shroud to direct the high Speed flow of refrigerant from the shroud to an adjacent oil sump; and providing a baffle in the oil sump, said baffle being disposed in the path of the flow from the shroud and acting to deflect the high speed flow from said shroud away from an oil pump disposed within said sump.

* * * * *